United States Patent [19]

Schubert

[11] 4,057,212

[45] Nov. 8, 1977

[54] FLUIDIC VIBRATION ISOLATOR

[75] Inventor: Dale W. Schubert, Sudbury, Mass.

[73] Assignee: Barry Wright Corporation, Watertown, Mass.

[21] Appl. No.: 604,908

[22] Filed: Aug. 15, 1975

[51] Int. Cl.² .................................. F16M 13/00
[52] U.S. Cl. ............................ 248/358 R; 60/513; 267/65 D
[58] Field of Search ............... 60/513, 531; 267/65 D; 248/20, 22, 358 R; 52/1

[56] References Cited

U.S. PATENT DOCUMENTS

| | | | |
|---|---|---|---|
| 2,012,674 | 8/1935 | Schultz | 60/531 |
| 2,080,576 | 5/1937 | Persons | 60/531 |
| 3,132,472 | 5/1964 | Schweitzer | 60/513 X |
| 3,667,707 | 6/1972 | Mui | 248/358 R |

Primary Examiner—William H. Schultz
Attorney, Agent, or Firm—Milton E. Gilbert

[57] ABSTRACT

Fluidic vibration isolation system which includes an isolator having a chamber, liquid and the vapor of the liquid in said chamber, heater means for heating the liquid and regulating means for controlling the heater depending upon the isolator relative height.

3 Claims, 3 Drawing Figures

000
FLUIDIC VIBRATION ISOLATOR

BACKGROUND OF THE DISCLOSURE

This invention is directed to vibration isolators and is more particularly directed to a new and improved fluidic isolator system in which a liquid and the vapor of the liquid are positioned in the isolator and the liquid is heated or permitted to cool to adjust the relative height of the isolator.

Pneumatic vibration isolators such as shown and described in U.S. Pat. Nos. 3,115,944, 2,956,761 and 2,613,925 and elastomeric-pneumatic vibration isolators such as shown in U.S. Pat. No. 3,836,134 use a compressed gas usually air contained within the isolator to support the static weight of the isolator payload or mechanical payload. These gas filled isolators are generally used to obtain a low mechanical spring stiffness and resulting low vibration system natural frequency.

The relative height of the payload with respect to the base of the isolator or other reference point (generally called the isolator relative height) is a function mainly of the static payload weight and the internal pressure contained within the isolator. At a gas pressure, generally represented by the symbol $P_i$, the isolator relative height is at the desired value. This height, however, will generally vary by large amounts as payload static weight is varied, and by smaller amounts as temperature and atmospheric pressure change.

In order to overcome the variation of relative isolator height changes with respect to payload weight and other environmental changes, the magnitude of the pressure $P_i$ is varied to maintain a constant relative height. This is generally accomplished by the use of mechanical or electromechanical pneumatic valves to automatically regulate the pressure $P_i$ in order to maintain a constant isolator static height in spite of payload static weight variations and other environmental changes.

While pneumatic valves work quite well, they have the disadvantage of being rather costly. Accordingly, a new and improved isolator regulating system was needed in order to control relative isolator height without the use of a pneumatic valve and pneumatic compressors for air supply.

The present invention provides such an isolation system which does away with the need for a pneumatic valve and compressed air supply.

BRIEF DESCRIPTION OF THE DISCLOSURE

In the present invention an isolator is partially filled with liquid and means is provided for altering the temperature of the liquid to cause the state of the liquid and the vapor partial pressure of the liquid in the isolator to change in order to control the relative isolator height.

As the temperature of the liquid is increased or decreased the vapor partial pressure of the liquid in the isolator will likewise increase or decrease thereby increasing or decreasing the pressure in the isolator.

This change in the gas pressure in the isolator will then cause the isolator height to be varied. In order to effectively control the gas pressure in the isolator, heating means is preferably immersed within the liquid in the isolator chamber and is controlled in accordance with means which indicates the actual height of the isolator.

DETAILED DESCRIPTION OF THE DISCLOSURE

Figure 1:
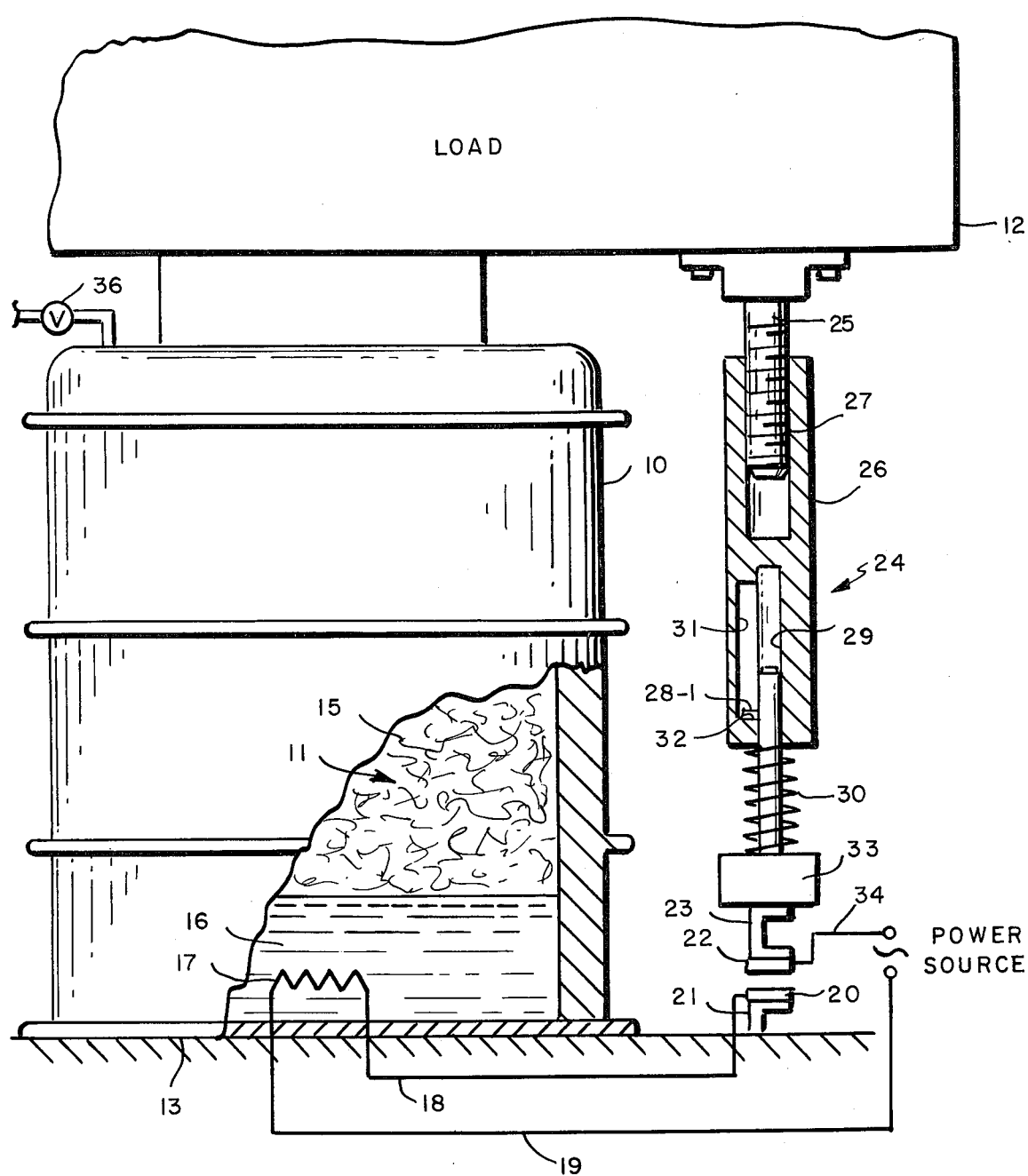
FIG. 1 is a diagrammatic view of the fluidic isolator system of this disclosure.

Reference should now be had to FIG. 1 for a detailed description of the fluidic isolator system of the invention. At 10 there is shown a fluidic vibration isolator of the aforementioned pneumatic type and which has an internal chamber 11. The isolator supports a payload 12 which rests on the isolator 10.

The isolator rests on the floor 13 as shown and holds the payload above the floor as a result of the pressure $P_i$ of gas 15 in the chamber 11. In this invention the isolator chamber 11 is also partially filled with a liquid 16, such as a Group 6 Freon compound (see Bulletin entitled "FREON COMPOUNDS AND SATETY", published by E. I. Du Pont De Nemours & Co., Wilmington, Delaware 19898, Copyright 1969, page 4, et sequentia). Thus the isolator chamber 11 includes the liquid 16, the vapor of the liquid (a gas) and probably some air.

Positioned within the liquid 16 is a heating element 17 e.g., a resistor heating element. The resistor 17 is provided electrical energy via insulated wires 18 and 19 leading out of the chamber 11. The wire 19 is directly coupled to a power source e.g., battery, or wall outlet, etc., and wire 18 is coupled to a contact 20 which is supported by an insulator bracket 21 above the floor 14.

The second contact is shown at 22 and is supported by an insulator bracket at 23 coupled to an adjustable height spring structure or unit 24. The structure 24 typically comprises a threaded member 25 supported by the payload (as shown) upon which there is mounted a member 26 having a threaded bore 27.

A rod member 28 having a key 28-1 is supported in a bore 29 and supports a spring 30 thereabout. A key way is shown at 31 and includes a stop 32 for preventing the rod from falling out of the bore 29.

The rod is terminated by a member 33 upon which spring 30 rests and which in turn supports contact supporting insulator 23. By rotating member 26 about threaded member 25 the height of the spring 30 and the position of the contact 22 may be varied. The contact 22 is coupled to the electrical energy source by a wire 34.

In the system shown in FIG. 1 the operating height of the isolator is established by the setting of the spring loaded contact 22 with respect to contact 21. The system of FIG. 1 operates as follows: initially the liquid 16 and vapor 15 are cool and when the payload 12 weight is applied the isolator 10 deflects downward below the desired static relative deflection, which closes the electrical contacts 20 and 22 as the payload moves therewith. With current flowing through the resistor 17 the liquid gas mixture is heated resulting in an increase in pressure $P_i$ inside the isolator. As temperature and pressure $P_i$ continue to increase, the payload is lifted upward until the desired isolator static deflection is reached, at which time the electrical contacts 20 and 22 open and no additional heat is supplied to the liquid gas mixture, however, thermal inertia allows the temperature to increase slightly.

The temperature will reach a maximum at which the isolator relative displacement will be slightly above the desired level. Natural cooling by normal heat transfer will lower the temperature of the liquid gas mixture resulting in a decrease in the isolator relative displacement. When the desired level is reached, the resistor will again be switched on and tend to increase the liquid vapor pressure. Hence, the payload 12 and isolator 10 will smoothly move up and down by a small amount about the desired level as the resistor 17 is switched on and off.

A pressure relief valve 36 may also be included as shown in FIG. 1, for safety reasons. The system of FIG. 1 is particularly applicable in situations where small amounts of current are to be drawn by the resistor heating element 17. In cases where it is desired that more current be provided to the resistive heating element 17, the control structure of FIG. 2 may be employed. In this figure like numbers are used to indicate like parts shown in FIG. 1.

Figure 2:
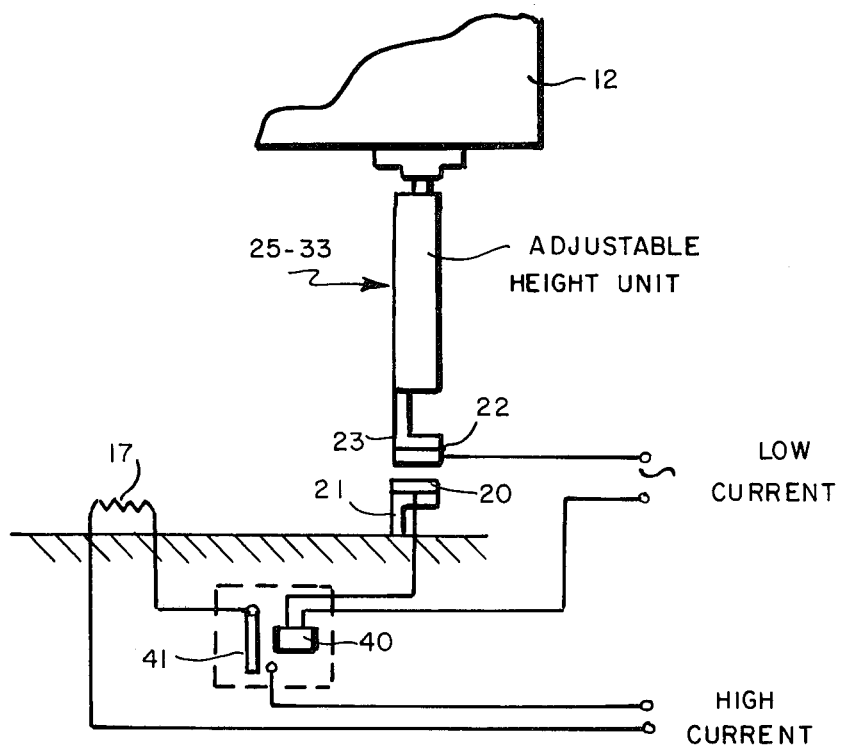
FIG. 2 is a diagrammatic view illustrating an alternate control for the fluidic isolator system of FIG. 1.

In FIG. 2 the box marked 25-33 represents the parts making up the adjustable height structure shown in FIG. 1. A low current supply is coupled to contact 22 and to relay coil 40. The closure of contact 22 on contact 20 provides current flow through coil 40 and thus closes relay contact 41. This in turn permits current from a high current supply to flow into resistive heating element 17 inside the isolator chamber 11.

Figure 3:
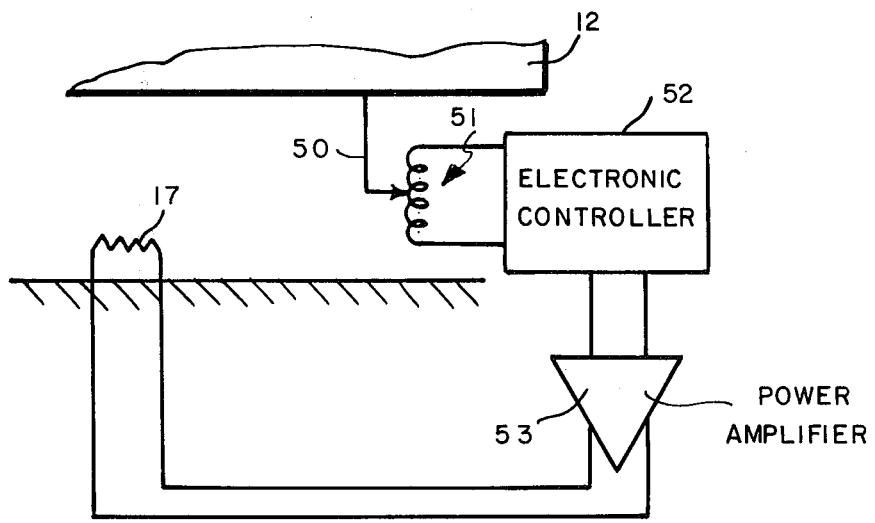
FIG. 3 is a diagrammatic view illustrating another alternative control for the fluidic isolator system of FIG. 1.

Reference should now be had to FIG. 3 which illustrates another embodiment of this invention. This embodiment permits continual monitoring of the relative height of the isolator with respect to a reference such as the floor. Once again the payload to be isolated is shown at 12 and coupled to a movable arm 50 of a displacement or position transducer 51.

The position transducer 51 provides a signal to a proportional electronic controller 52 e.g., a comparator which compares the input signal with a reference signal to provide a conventional difference output control signal. The difference signal is then applied to control a power amplifier 53 which controls the flow of electrical energy to the resistive heating element 17 thereby causing the temperature of the resistive heating element to be varied.

It should be understood that other conventional servo systems may be employed as will be obvious to those skilled in the art in place of the one shown.

From the above it should be apparent that a new and improved system has been provided for controlling a fluidic isolator. It should be understood that other vaporizable liquids e.g., liquid oxygen, nitrogen, and alcohols, etc., may be used if cooling is provided.

It should also be apparent that the displacement sensor shown in FIG. 3 or the other contact sensors shown in FIGS. 1 and 2 may be coupled directedly to the isolator top itself rather than to the more accessible payload as shown. It should also be understood that other types of heater devices may be used in place of resistor 17. Additionally, it should be understood that this invention is applicable to pneumatic vibration isolators made at least in part of flexible material or other types such as shown in U.S. Pat. Nos. 3,115,944, 2,956,761, 2,613,925 and 3,836,134.

I claim:

1. A vibration isolator system comprising a vibration isolator having a closed chamber, a liquid in said chamber, a vapor of said liquid in said chamber, heating means positioned in said chamber for heating said liquid and sensing means for sensing the relative height of said isolator to control the temperature of said liquid in said chamber, said sensing means comprises an adjustable height spring or rigid structure supporting a first contact, a second contact means coupling said contacts to a source of energy and means coupling said heating means to said contacts.

2. A vibration isolator system comprising a vibration isolator having a closed chamber, a liquid in said chamber, a vport of said liquid in said chamber, heating means positioned in said chamber for heating said isolator to control the temperature of said liquid in said chamber, said sensing means comprises an adjustable height spring structure supporting a first contact, a second contact, a relay coil coupled to said first and second contacts, a source of electrical energy coupled to said coil and one of said contacts, a relay switch controlled by said relay coil, said relay switch closing a circuit between a source of electrical energy and the heating means.

3. A vibration isolator system comprising a vibration isolator having a closed chamber, a liquid in said chamber, a vapor of said liquid in said chamber, heating means positioned in said chamber for heating said liquid and sensing means for sensing the relative height of said isolator to control the temperature of said liquid in said chamber, said sensing means comprises a displacement sensor means which provides a continuous input signal to control the electrical power provided to said heating means.

* * * * *

UNITED STATES PATENT AND TRADEMARK OFFICE
CERTIFICATE OF CORRECTION

PATENT NO. : 4,057,212
DATED : November 8, 1977
INVENTOR(S) : Dale W. Schubert

It is certified that error appears in the above-identified patent and that said Letters Patent are hereby corrected as shown below:

Column 2, line 24: Delete "SATETY" and substitute therefor "SAFETY"

Column 4, line 29: Delete "vport" and substitute therefor "vapor"

Column 4, line 31: Insert after the word "heating" the following: "said liquid and sensing means for sensing the relative height of"

Signed and Sealed this

Fourteenth Day of February 1978

[SEAL]

Attest:

RUTH C. MASON
*Attesting Officer*

LUTRELLE F. PARKER
*Acting Commissioner of Patents and Trademarks*